(12) United States Patent
Loree

(10) Patent No.: US 11,912,211 B2
(45) Date of Patent: Feb. 27, 2024

(54) HINGED PLACARD HOLDER

(71) Applicant: Dean Loree, Kitchener (CA)

(72) Inventor: Dean Loree, Kitchener (CA)

(73) Assignee: Dean Loree, Kitchener (CA)

( * ) Notice: Subject to any disclaimer, the term of this patent is extended or adjusted under 35 U.S.C. 154(b) by 0 days.

(21) Appl. No.: 17/015,523

(22) Filed: Sep. 9, 2020

(65) Prior Publication Data

US 2021/0070236 A1 Mar. 11, 2021

Related U.S. Application Data

(60) Provisional application No. 62/897,642, filed on Sep. 9, 2019.

(51) Int. Cl.
*G09F 21/04* (2006.01)
*B60R 13/10* (2006.01)
*G09F 7/08* (2006.01)

(52) U.S. Cl.
CPC .............. *B60R 13/105* (2013.01); *G09F 7/08* (2013.01); *G09F 21/04* (2013.01); *G09F 21/048* (2013.01)

(58) Field of Classification Search
CPC .... A47G 2001/0666; A47G 2001/0688; A47G 29/1209; A47G 29/12095; A47G 1/06; A47G 29/122; G09F 1/10; G09F 3/20
USPC ................. 232/38, 1; 312/234, 234.1–234.4
See application file for complete search history.

(56) References Cited

U.S. PATENT DOCUMENTS

| 231,473 A * | 8/1880 | Brower ..................... A47G 1/06 40/765 |
| 1,001,080 A * | 8/1911 | Rosenberg et al. .... A47G 29/12 232/38 |
| 1,269,828 A * | 6/1918 | Lockard .................... A47G 1/06 40/779 |
| 1,573,264 A * | 2/1926 | Mankameyer ...... G09F 15/0012 40/611.03 |
| 5,664,851 A * | 9/1997 | Dunn ........................ G09F 3/20 312/102 |
| 5,845,843 A * | 12/1998 | Kuller .................... A47G 29/12 232/38 |
| 6,012,786 A * | 1/2000 | Dunn ....................... A47F 3/005 206/214 |
| 6,817,125 B2 * | 11/2004 | Chatterjea ................ A47G 1/24 40/606.15 |
| 6,932,218 B2 * | 8/2005 | Kosann .................. A45C 11/00 206/449 |
| 8,800,188 B1 * | 8/2014 | Fishel .................. A47B 43/006 40/711 |
| 10,410,547 B2 * | 9/2019 | Kopelke ................... G09F 7/18 |
| 2004/0139633 A1 * | 7/2004 | Shannon ................. G09F 19/00 40/124.5 |
| 2011/0061571 A1 * | 3/2011 | Hilde ..................... A47B 43/00 108/35 |

(Continued)

*Primary Examiner* — Cassandra Davis
(74) *Attorney, Agent, or Firm* — Bereskin & Parr LLP

(57) ABSTRACT

Placard holders and methods of securing a placard card to a placard holder are described herein. The placard holders include a backing plate; a holder portion movably coupled to the backing plate, the holder portion including an opening and a pocket extending from the opening for receiving a placard card; and a fastener coupled to the backing plate, the fastener being configured to secure a side of the holder portion to the backing plate to retain the placard card in the pocket.

14 Claims, 8 Drawing Sheets

(56) References Cited

U.S. PATENT DOCUMENTS

2016/0017554 A1* 1/2016 Snyder .................. G09F 7/002
                                                                                                          40/533

* cited by examiner

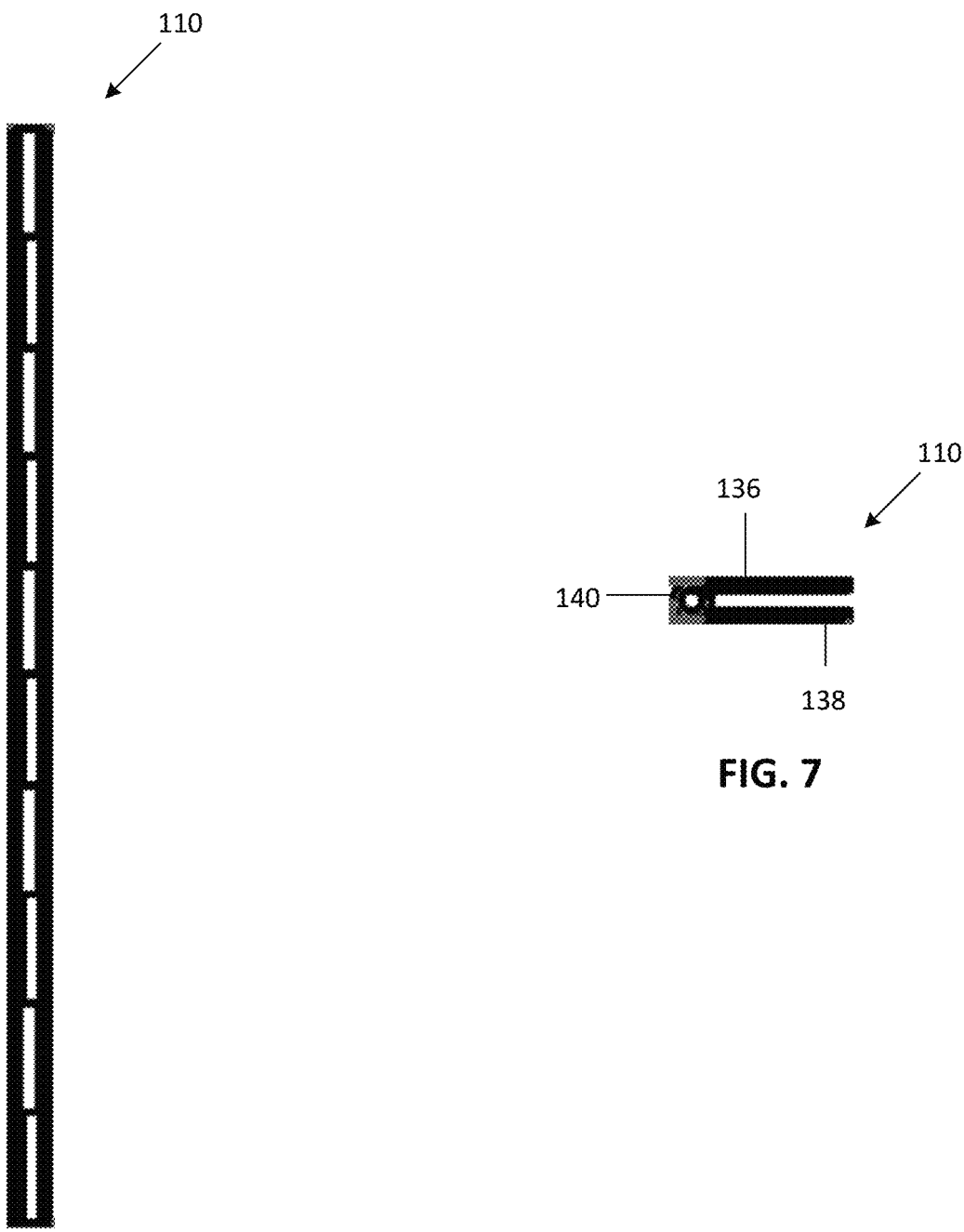

HINGED PLACARD HOLDER

CROSS REFERENCE

This application claims the benefit of U.S. Provisional Patent Application No. 62/897,642 entitled "Hinged Placard Holder" filed Sep. 9, 2019, the entire contents of which are incorporated herein by reference.

TECHNICAL FIELD

The embodiments disclosed herein relate to placard holders, and more specifically to hinged placard holders.

BACKGROUND

Many countries have federal regulations in place that designate specific materials as "hazardous" for purposes of transportation. Hazardous materials are generally placed in one or more of a plurality of categories based on their chemical and physical properties. For each hazardous material, these regulations generally also specify identification requirements for vehicles including trucks, truck trailers, trains, tank cars, cargo tanks and other transport vehicles carrying these materials based on the category of the hazardous material. These identification requirements typically include placarding a vehicle carrying hazardous materials to notify transportation workers, emergency workers and the public in general to the presence and type of hazardous material contained in the vehicle.

Placards placed on the vehicle typically have specific indicia (e.g. graphics, text, and color) that classify the hazardous material being transported by the vehicle. Trucks and trailers may be used to transport different types of hazardous materials, thereby necessitating periodically removing and replacing placards on the truck or trailer to correspond with a different material contained in the vehicle.

One method of applying hazard classification placards to a vehicle includes affixing adhesive labels directly to a surface of the vehicle. The labels have the proper size, shape and indicia that correspond to the hazardous material in the vehicle. Unfortunately, adhesive labels affixed directly to the vehicle may not be properly secured and may fall off the vehicle during travel.

Rigid placard holders that are sized and shaped to hold rigid placard cards are also currently used, but due to the necessity to secure the placard card within the holder, it is often cumbersome or difficult for an operator to remove and replace placard cards held in these holders.

Accordingly, there is a need for a placard holder that can be easily secured to a vehicle, that can secure a placard card therein and that can provide for the placard card secured therein to be easily removed and replaced.

SUMMARY

According to a broad aspect, placard holders are described herein. The placard holders include a backing plate; a holder portion movably coupled to the backing plate, the holder portion including an opening and a pocket extending from the opening for receiving a placard card; and a fastener coupled to the backing plate and configured to secure a side of the holder portion to the backing plate to retain the placard card in the pocket.

In some embodiments, the placard holder includes a hinge configured to hingedly couple the holder portion to the backing plate.

In some embodiments, the hinge is coupled to the backing plate at a position opposed to the fastener.

In some embodiments, the fastener is configured to secure the opening to the backing plate and the hinge is coupled to the backing plate at a bottom edge of the backing plate.

In some embodiments, the hinge is coupled to the holder portion at a bottom edge of the holder portion.

In some embodiments, the hinge provides for the placard holder to move between a closed position where the placard card is secured in the pocket and an open position where the placard card is removable from the pocket through the opening.

In some embodiments, the hinge is coupled to the backing plate by rivets.

In some embodiments, the hinge is coupled to the holder portion by rivets.

In some embodiments, the fastener includes a base portion coupled to the backing plate and a spring arm biased downwardly towards the base portion, the spring arm defining a second cavity for receiving a portion of the holder portion to retain the holder portion against the backing plate.

In some embodiments, the pocket of the holder portion is sized retain more than one placard card.

In some embodiments, the holder portion includes two side folds, each fold extending along an opposed side of the holder portion to define the pocket.

In some embodiments, the holder portion includes at least one bottom fold extending between the side folds to define the pocket, the bottom fold being opposed to the opening.

In some embodiments, the holder portion is primarily made of aluminum.

In some embodiments, the backing plate is primarily made of aluminum.

In some embodiments, the backing plate is configured to be mounted to a transportation vehicle.

In some embodiments, the hinge is configured to provide for the holder portion to rotate about an axis parallel to a bottom edge of the backing plate to provide for a user to insert a placard card into the holder portion.

In some embodiments, the hinge is configured to provide for the holder portion to rotate at least 180 degrees about the bottom edge of the backing plate to provide for a user to insert a placard card into the holder portion.

According to another broad aspect, a method of securing a placard card in a placard holder is described herein. The method includes inserting a placard card into a holder portion of a placard holder; rotating the holder portion of the placard holder towards a backing plate of the placard holder; and securing the holder portion to the backing plate to retain the placard card in the holder portion.

In some embodiments, rotating the holder portion of the placard holder towards the backing plate include rotating the holder portion of the placard holder about a hinge coupled to the holder portion and the backing plate.

In some embodiments, securing the holder portion to the backing plate includes securing the holder portion to the backing plate by a fastener positioned opposed to the hinge.

These and other features and advantages of the present application will become apparent from the following detailed description taken together with the accompanying drawings. However, it should be understood that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIG. 6 shows an end view of the hinge of FIG. 5.

FIG. 7 shows a side view of the hinge of FIG. 5.

Figure 1:
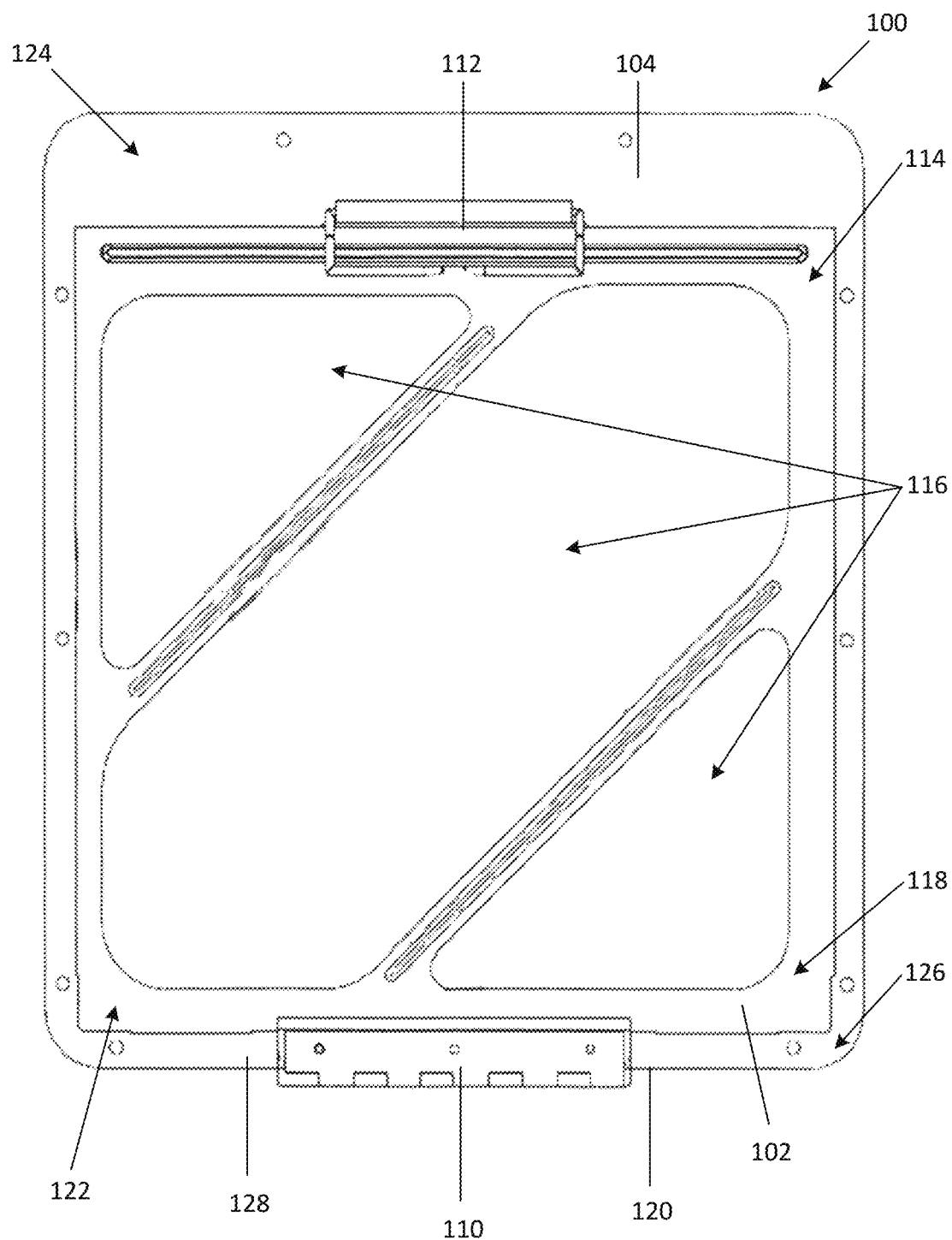
FIG. 1 shows a front view of a hinged placard holder, according to at least one embodiment.

The skilled person in the art will understand that the drawings, further described below, are for illustration purposes only. The drawings are not intended to limit the scope of the applicant's teachings in any way. Also, it will be appreciated that for simplicity and clarity of illustration, elements shown in the figures have not necessarily been drawn to scale. For example, the dimensions of some of the elements may be exaggerated relative to other elements for clarity. Further aspects and features of the example embodiments described herein will appear from the following description taken together with the accompanying drawings.

DETAILED DESCRIPTION

Various apparatus and methods will be described below to provide an example of each claimed embodiment. No embodiment described below limits any claimed embodiment and any claimed embodiment may cover apparatus or methods that differ from those described below. The claimed embodiments are not limited to apparatus or methods having all of the features of any one apparatus or method described below or to features common to multiple or all of the apparatus or methods described below.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As one of ordinary skill would appreciate, different persons may refer to the same feature or component by different names. This document does not intend to distinguish between components or features that differ in name only. In the following description and in the claims, the terms "including" and "comprising" are used in an open-ended fashion, and thus, should be interpreted to mean "including, but not limited to."

The word 'a' or 'an' when used in conjunction with the term 'comprising' in the claims and\or the specifications may mean 'one', but it is also consistent with the meaning of 'one or more', at least one and one or more than one unless the content clearly that dictates otherwise. Similarly, the word 'another' may mean at least a second or more unless the content clearly dictates otherwise.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described and are considered to be within the scope of the disclosure.

"At least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, to at least one, optionally including more than one, A, with no B present (and optionally including entities other than B); to at least one, optionally including more than one, B, with no A present (and optionally including entities other than A); to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

Where two or more ranges are used, such as but not limited to 1 to 5 or 2 to 4, any number between or inclusive of these ranges is implied.

As used herein, the phrases "for example," "as an example," and/or simply the terms "example" or "exemplary," when used with reference to one or more components, features, details, structures, methods and/or figures according to the present disclosure, are intended to convey that the described component, feature, detail, structure, method and/or figure is an illustrative, non-exclusive example of components, features, details, structures, methods and/or figures according to the present disclosure. Thus, the described component, feature, detail, structure, method and/or figure is not intended to be limiting, required, or exclusive/exhaustive; and other components, features, details, structures, methods and/or figures, including structurally and/or functionally similar and/or equivalent components, features, details, structures, methods and/or figures, are also within the scope of the present disclosure. Any embodiment or aspect described herein as "exemplary" is not to be construed as preferred or advantageous over other embodiments.

Herein, the term "placard card" generally refers to a card that is used as a dangerous goods safety mark and is displayed on a large means of containment such as but not limited to a vehicle transporting a dangerous material. Placard cards are generally used to identify dangerous materials and to show the nature of the danger they pose. The placard cards described herein have a front side and a rear side (not shown). At least the front side of the placard card includes information about an identity of a dangerous material. For example, the front side of the placard card may include indicia indicative of the specific identity of the dangerous material or a particular warning about the particular danger posed by the dangerous material (e.g. "flammable" or "corrosive", or visuals symbols indicating the same).

Referring now to FIG. 1, illustrated therein is a placard holder 100 according to one embodiment. Placard holder 100 includes a holder portion 102 movably coupled to a backing plate 104. Placard holder 100 also includes a fastener 112 engaged with (e.g. coupled or affixed to) the backing plate 104 and configured to secure at least a portion of the holder portion 102 to the backing plate 104 to retain at least one placard card in pocket 106 (see FIG. 2). For instance, as shown in the embodiment in FIG. 1, the fastener 112 is configured to secure a top end 114 (opening 108) of the holder portion 102 to the backing plate 104.

Figure 2:
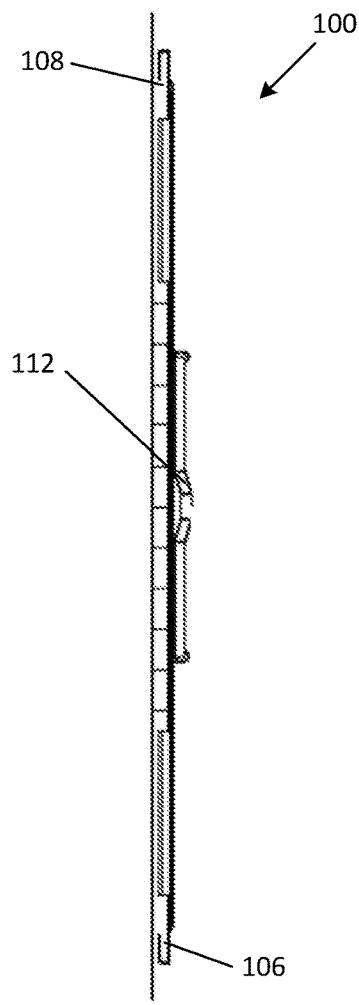
FIG. 2 shows a bottom view of the hinged placard holder of FIG. 1.
Figure 3:
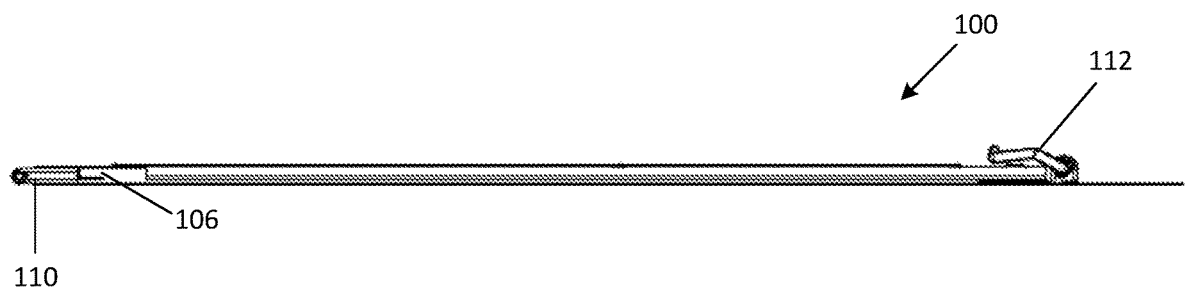
FIG. 3 shows a side view of the hinged placard holder of FIG. 1.

Referring now to FIGS. 2 and 3, holder portion 102 includes an opening 108 and a pocket 106 extending away from opening 108 for receiving a placard card. Pocket 106 and opening 108 are sized and shaped to receive and retain at least one placard card therein.

Returning to FIG. 1, the holder portion 102 is hingedly coupled to the backing plate 104 on one side or end by a hinge 110. Hinge 110 is coupled to the holder portion 102 at a position spaced from the opening 108 to provide for a user to insert a placard card into the pocket 106 via the opening 108 without interference from the hinge 110. For instance, in the embodiment shown in the Figures, the hinge 110 is positioned at a bottom end 118 of the holder portion 102. Specifically, in the embodiment shown in the Figures, hinge 110 is affixed (e.g. riveted) to a bottom edge 120 of the holder portion 102. It should be understood that the hinge 110 can be coupled to the holder portion 102 in any appropriate manner that secures the hinge 110 to the holder portion 102, such as but not limited to being riveted to the holder portion 102 using one or more rivets.

Holder portion 102 may be square-shaped or substantially square-shaped (e.g. may have rounded corners) and may be planar or substantially planar. Holder portion 102 may include a plurality of windows 116 sized to provide for a placard card retained in the pocket 106 to be viewable while looking at a front view of the placard holder 100. Pocket 106 is positioned rearwardly of a front surface 122 of the holder portion 102 and forward of a front face 124 of the backing plate 104.

In the embodiment shown in the Figures, hinge 110 is coupled to the backing plate 104 at a position spaced from fastener 112 to provide for a user to insert a placard card into the pocket 106 via the opening 108 without interference from the fastener 112 when the placard holder is in its open position. For instance, in the embodiment shown in the Figures, the hinge 110 is positioned at a bottom end 126 of the backing plate 104. Specifically, in the embodiment shown in the Figures, hinge 110 is affixed (e.g. riveted) to a bottom edge 126 of the backing plate 104. It should be understood that the hinge 110 can be coupled to the backing plate 104 in any appropriate manner that secures the hinge 110 to the backing plate 104, such as but not limited to being riveted to the backing plate 104 using one or more rivets.

Backing plate 104 is also generally square-shaped or substantially square-shaped (e.g. may have rounded corners) and planar or substantially planar (e.g. may have minor indentations or protrusions). Backing plate 104 may also include a plurality of fasteners (not shown) to secure the placard holder 100 to a transportation container (not shown).

Figure 4:
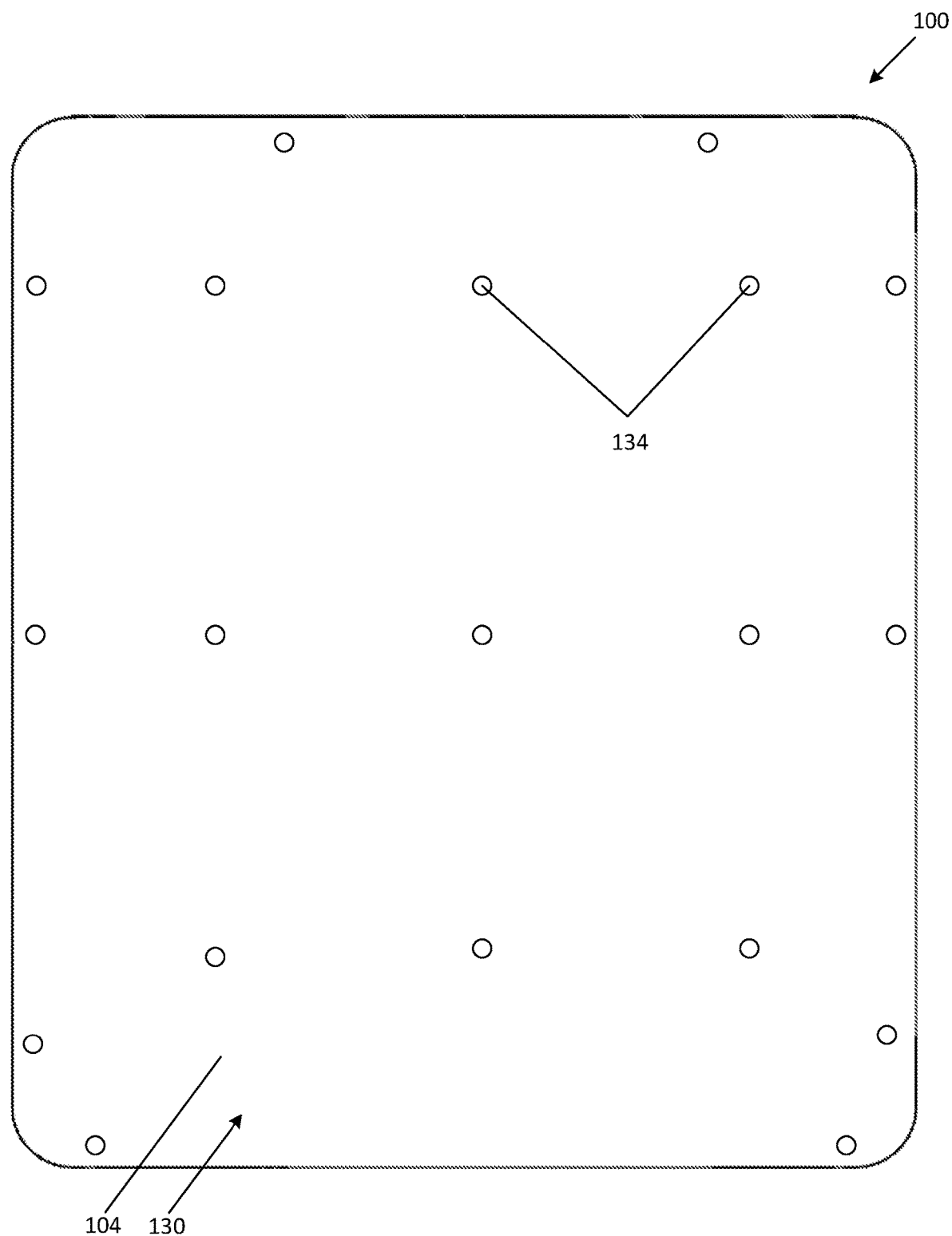
FIG. 4 shows a rear view of the hinged placard holder of FIG. 1.

Turning now to FIG. 4, shown therein is a rear view of the backing plate 104 showing rear surface 130. Backing plate 104 may include a plurality of protrusions 134 extending outwardly from the backing plate 104 (i.e. from a front surface thereof) towards the holder portion 102 and a placard card retained therein. Protrusions 134 may inhibit a placard card retained in the holder portion 102 from sticking to the backing plate 104. Protrusions 134 may also push the placard card towards the holder portion 102 to inhibit movement of the placard card when retained in the holder portion 102.

Figure 5:
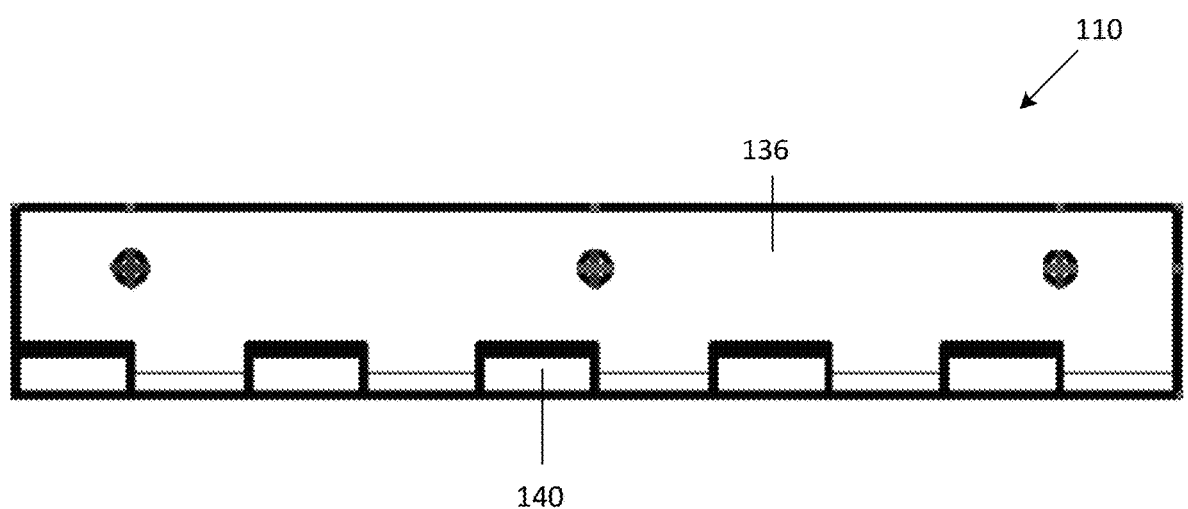
FIG. 5 shows a front view of a hinge of the hinged placard holder of FIG. 1, according to at least one embodiment.

An example embodiment of a hinge 110 is shown in FIGS. 5-7. Hinge 110 can be any movable joint or mechanism on which holder portion 102 rotates or swings as holder portion 102 moves between its open and closed positions and which couples holder portion 102 to backing plate 104. In the embodiment shown, hinge 110 includes a first plate portion 136, a second plate portion 138 and a pin 140 therebetween. First plate 136 is coupled (e.g. affixed by rivets) to the holder portion 102 and the second plate portion 138 is coupled (e.g. affixed by rivets) to the backing plate 104. A portion of first plate portion 136 and second plate portion 138 wrap around pin 140 to provide for first plate portion 136 and second plate portion 138 to rotate about the pin 140. In at least one embodiment, hinge 110 provides for holder portion to rotate at least one 180 degrees to provide for a user to insert a placard card into the holder portion.

Figure 8:
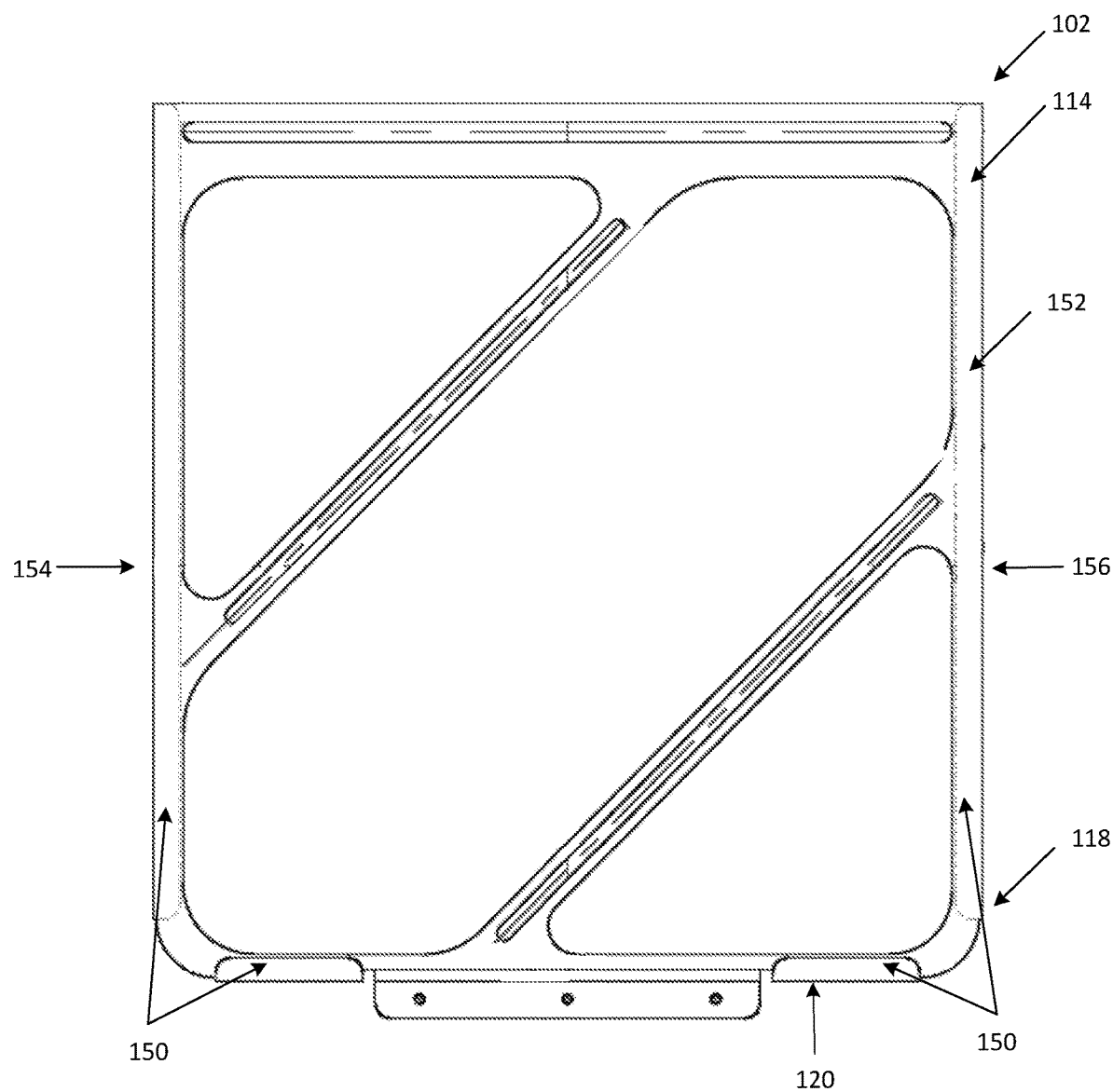
FIG. 8 shows a rear view of a holding portion of the hinged placard holder of FIG. 1.

FIG. 8 shows an exemplary embodiment of holder portion 102. FIG. 8 shows that pocket 106 is defined by a plurality of folds 150 of the holder portion 102. Folds 150 are extensions of a frame 152 of the holder portion 102 that fold rearwardly from the front surface 122 of the holder portion 102 to provide a spacing to define the pocket 106. The spacing can be configured to retain a placard card therein. One or more of the folds 150 may extend along each of first side 154 and second side 156 of the holder portion 102 and one or more folds 150 may extend along a bottom edge 120 of the holder portion 102.

Figures 9A, 9B:
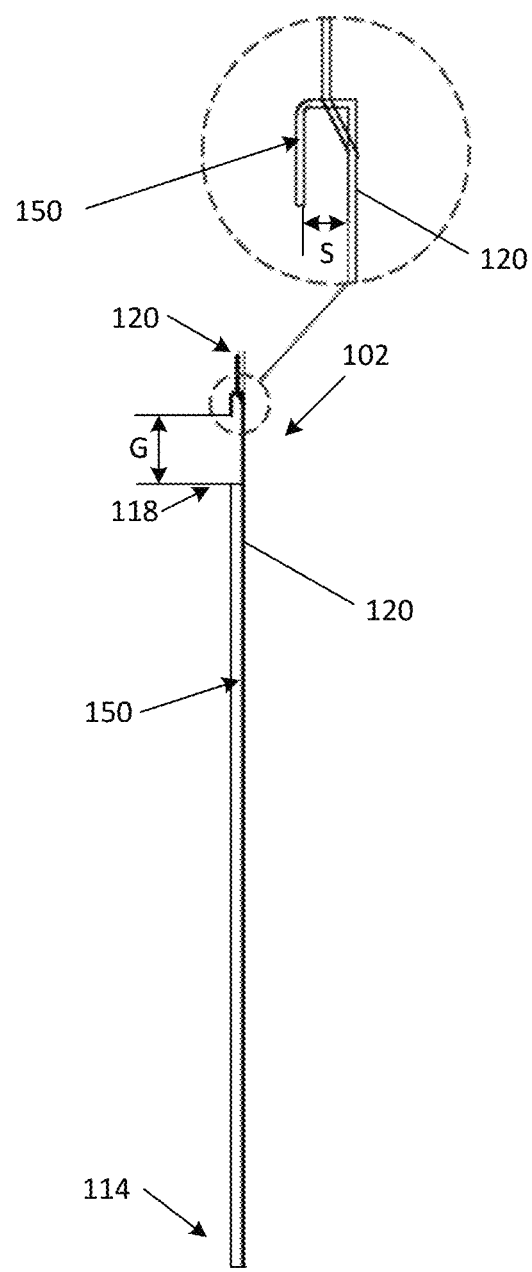
FIG. 9A shows an end view of the holding portion of FIG. 8.
FIG. 9B shows a magnified view of the end view of FIG. 9A showing a fold of the holder portion.

FIG. 9A shows a side view of the holder portion 102 of FIG. 1. FIG. 9B shows that, in at least one embodiment, the folds 150 are continuous with front surface 122 of the holder portion 102. Folds 150 may be sized to define a spacing S appropriate for retaining a placard card therein. In some embodiments, spacing S is sized to retain more than one placard card, such as but not limited to three or four or five placard cards. For instance, spacing S may be in a range of about 0.1 inches to about 2 inches, or in a range of about 0.1 to about 1 inch. In at least one embodiment, placard cards not being used to identify the dangerous goods of the container upon which the placard holder is attached can be stored in the holder portion 102.

In some embodiments, adjacent folds 150 may be spaced apart from each other by a gap G sized to provide for drainage of water from between the backing plate 104 and the holder portion 102.

Figure 10:
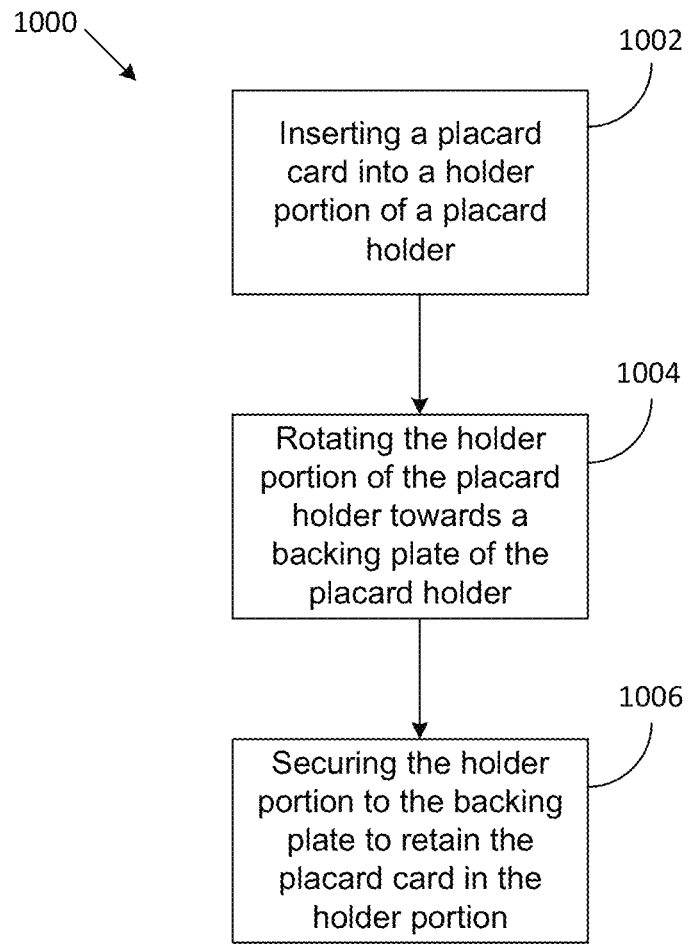
FIG. 10 is a block diagram of a method of securing a placard card in a placard holder, according to one embodiment.

Referring now to FIG. 10, illustrated therein is a method 1000 of securing a placard card in a placard holder.

To secure the placard in the holder portion 102, an operator grasps the holder portion 102 and rotates the holder portion 102 outwardly relative to the backing plate 104 about the hinge 110. When the holder portion 102 is sufficiently spaced from the fastener 112, the opening 108 is exposed and, at step 1002, the operator can insert the placard card into the pocket 106 defined by the holder portion 102 via the opening 108.

Once the placard card is received in the pocket 106, the operator can secure the placard card in the holder portion 102 by, at step 1004, returning the holder portion 102 to its closed position by rotating the holder portion 102 towards the backing plate 104 about the hinge 110. When the holder portion 102 approaches the backing plate 104, at step 1006, the fastener can be manipulated to secure the holder portion 102 to the backing plate 104 to retain the placard card in the holder portion 102.

The placard holders described herein can be secured to a transportation container (not shown), such as but not limited to a truck, an intermodal container (e.g. a trailer), a railcar, a storage tank or the like or any similar container not used in transportation. The placard holders may be secured to the transportation container by fasteners such as rivets or bolts or by an adhesive affixed to a rear surface (not shown) of the placard holders.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

What is claimed is:

1. A placard holder comprising:
   a backing plate;
   a holder portion movably coupled to the backing plate, the holder portion including:
     an opening at a top end of the holder portion;
     a pocket extending from the opening for receiving a placard card; and
     two side folds, each side fold extending along an opposed side of the holder portion to define the pocket;
   a hinge hingedly coupling the holder portion to the backing plate, the hinge being coupled to the backing plate at a bottom edge of the backing plate; and
   a fastener coupled to the backing plate and configured to secure the top end of the holder portion to the backing plate to retain the placard card in the pocket, the fastener covering a portion of the opening when the fastener secures the top end of the holder portion to the backing plate.

2. The placard holder of claim 1, wherein the hinge is coupled to the backing plate at a position opposed to the fastener.

3. The placard holder of claim 1, wherein the hinge is coupled to the holder portion at a bottom edge of the holder portion.

4. The placard holder of claim 1, wherein the hinge provides for the placard holder to move between a closed position where the placard card is secured in the pocket and an open position where the placard card is removable from the pocket through the opening.

5. The placard holder of claim 1, wherein the hinge is coupled to the backing plate by rivets.

6. The placard holder of claim 1, wherein the hinge is coupled to the holder portion by rivets.

7. The placard holder of claim 1, wherein the pocket of the holder portion is sized retain more than one placard card.

8. The placard holder of claim 1, wherein the holder portion includes at least one bottom fold extending between the side folds to define the pocket, the bottom fold being opposed to the opening.

9. The placard holder of claim 1, wherein the holder portion is made of aluminum.

10. The placard holder of claim 1, wherein the backing plate is made of aluminum.

11. The placard holder of claim 1, wherein the backing plate is configured to be mounted to a transportation vehicle.

12. A placard holder comprising: a backing plate;
    a holder portion movably coupled to the backing plate, the holder portion including:
      an opening at a top end of the holder portion; and
      a pocket extending from the opening for receiving a placard card;
    a hinge hingedly coupling the holder portion to the backing plate, the hinge being coupled to the backing plate at a bottom edge of the backing plate and being configured to provide for the holder portion to rotate at least 180 degrees about an axis parallel to a the bottom edge of the backing plate to provide for a user to insert a the placard card into the holder portion; and
    a fastener coupled to the backing plate and configured to secure the top end of the holder portion to the backing plate to retain the placard card in the pocket, the fastener covering a portion of the opening when the fastener secures the top end of the holder portion to the backing plate.

13. The placard holder of claim 1, wherein, when the fastener secures the top end of the holder portion to the backing plate, the fastener extends downwardly over the portion of the opening.

14. The placard holder of claim 13, wherein, when the fastener secures the top end of the holder portion to the backing plate, the fastener extends downwardly over the portion of the opening and engages a front surface of the holder portion.

* * * * *